March 14, 1950  M. BONNET  2,500,511
RELIEF PHOTOGRAPH HAVING REFLECTING BACKS
Filed Dec. 7, 1945
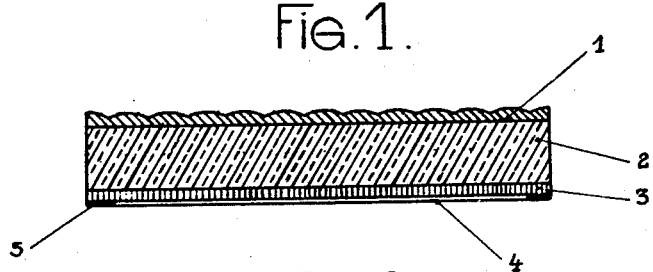
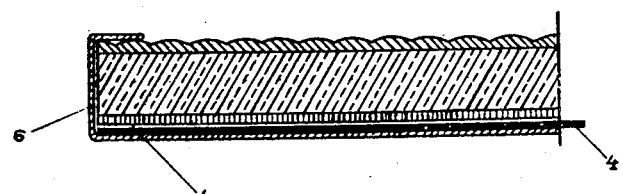
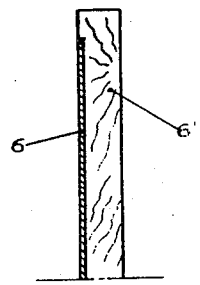
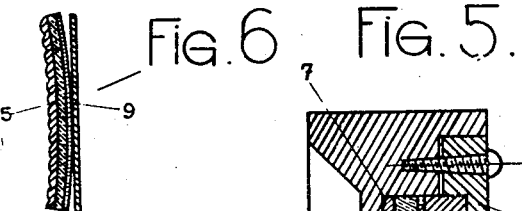
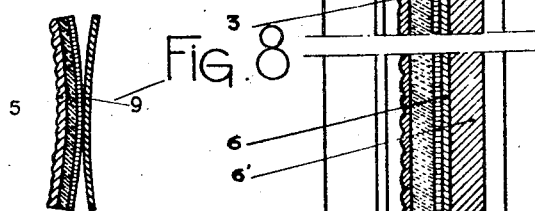
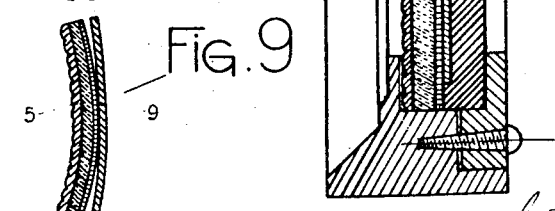
Inventor
M. Bonnet

UNITED STATES PATENT OFFICE 2,500,511

RELIEF PHOTOGRAPH HAVING REFLECTING BACK

Maurice Bonnet, Paris, France, assignor to La Reliephographie, Société pour l'Exploitation des Procédés de Photographie en Relief Maurice Bonnet, Paris, France, a French corporation Application December 7, 1945, Serial No. 633,518
In France July 10, 1944

Section 1, Public Law 690, August 8, 1946
Patent expires July 10, 1964

2 Claims. (Cl. 88—1)

In my co-pending patent application, Ser. No. 633,510, filed December 7, 1945, I have described and illustrated a peristereoscopic image in which the selecting grating proper is constituted by a goffered surface, which latter is secured to a transparent rigid support. This same support receives, on the rear face thereof, the photographic emulsion, and this homogenous unit has for convenience been called a "selectoplate." The rear reflecting-diffusing surface is then placed in position, after which the unit is rigidly assembled by any means, in order to constitute the finished peri-stereoscopic picture.

This embodiment offers the great advantage of ensuring an unalterable coincidence between the image lines contained in the emulsion and the lenticular elements of the selecting grating, since these two elements are carried by a common support.

My co-pending application Ser. No. 633,514 describes, inter alia, a method relating to the particular nature of the reflecting-diffusing surface mentioned in the first application aforementioned, and which is simply formed by a back coating made of stretched reflecting and diffusing paper, closely applied but not stuck on to the image, owing to the fact that it is secured to the latter through its edges only.

The present invention contemplates the utilisation of an improved back intended for peri-stereoscopic images if this kind, which back is essentially characterised by the fact that it has per se a sufficient rigidity to play its part perfectly by the simple clamping thereof against the image layer, without it being necessary to stretch it or to secure it to the "selectoplate."

Moreover, nothing prevents said back from being however assembled definitely to the "selectoplate", if such a securing in position is considered desirable.

The invention also relates to certain particular forms of construction of said rigid back, which greatly extends the possibilities of execution and utilisation of peri-stereoscopic images as shown by the few embodiments which will be indicated later on. Furthermore, said back, forming a shield, efficiently ensures the protection of the image-layer against deterioration.

As pointed out above, the name "selectoplate" has been given to the combination of a transparent rigid support carrying on one face a lenticular selector screen, and on the other face a photo-sensitive layer, while a "selectograph" is a transparent rigid support having one plane face and whose other face carries a lenticular selector screen. In other words, a "selectoplate" is a "selectograph" combined with a photo-sensitive layer.

In accordance with the essential feature of the invention, the contact between the "selectoplate" and the back is first of all ensured at the centre of the image, when said two elements of the "selectograph" are clamped together at the edges thereof. Said central contact can be obtained by simply curving, either the "selectoplate", or the back, or both said elements at the same time.

From this standpoint, it should be noted that the "selectoplates" of the type described in the first application above-mentioned already have a certain concavity, promoting the application of the separate reflecting-diffusing back. Said concavity results from the contraction or retraction of the thermoplastic layer secured to the glass, after it has been moulded in the hot state, in order to form therein the lenticular elements of the "selectoscope." According to a first embodiment of the invention, I take advantage of said particularity for ensuring perfect contact between the image-layer and the rigid back.

To this end, the thickness of the moulded thermoplastic layer is chosen, with respect to the thickness of the supporting glass of the "selectoplate," so as to determine the degree of curvature necessary and sufficient for ensuring the close application of the image layer against the rigid back. In a practical embodiment, I have found that a thickness of cellulose acetate of $\frac{2}{10}$ mm. determined, on a plate of 30 x 40 cm., a curvature of about 1 mm. sag at the centre, quite sufficient for obtaining the result sought.

According to a first embodiment of the back proper, the baryta paper for instance, constituting the reflecting-diffusion surface is stuck to a thin sheet metal plate or other rigid material, and the latter is then assembled with the "selectoplate" by beading the edges thereof, or by any other suitable means (framing for instance).

The required reflecting and diffusing properties can be, according to another embodiment, imparted to the back itself, by means of a treatment or of a suitably chosen coating, having properties equivalent to those of baryta paper.

Finally, the rigid back according to the invention may be incorporated in the ornamental frame used for mounting the peri-stereoscopic picture, or it may form an integral part of the bottom of said frame, in order to ensure the close application of the back against the image.

If the back is constituted by a loose sheet or plate carrying for instance on the front face thereof a stuck sheet or baryta paper, or equivalent coating, said sheet or plate may carry on the opposite face thereof a paper stuck after being moistened, for instance, exerting after drying a tension greater than that of baryta paper.

Under these conditions, the back will have a slight convexity turned towards the convexity of the "selectoplate" itself. Close contact is thus ensured against the entire surface of the image, when the back is pressed against the latter through the edges thereof.

A suitable cylindrical or like shape may also be given to the back, made of sheet metal or other thin material in accordance with the invention, by means of a suitable mechanical operation.

Fig. 1 is an enlarged transverse sectional view of a relief photograph according to the invention of my prior application Serial No. 633,514.

Fig. 2 is a similar view of a photograph incorporating in addition the improvements of the present invention, Fig. 3 is a sectional view of a modification in which the reflecting diffusing surface is incorporated in a picture frame, Fig. 4 is a sectional view showing the reflecting diffusing surface applied as by coating to a picture frame surface, Fig. 5 is a transverse section of a frame including a relief photograph placed therein, and Figs. 6 to 9 are schematic sectional views of various modifications in the application of the invention.

In the accompanying drawings:

Figure 1 shows cross-section of a peri-stereoscopic obtained according to the afore-mentioned co-pending patent application Ser. No. 633,514. The "selectoscope" is designated by 1, 2 shows the glass support, 3, the image-layer and 4, the reflecting and diffusing paper, stuck through its edges only, as indicated at 5.

Figure 2 shows a "selectoplate" according to Figure 1, equipped with a rigid reflecting-diffusing back according to the present invention. In this embodiment, said back 6 is secured to the "selectoplate" by beading the edges thereof. Its reflecting and diffusing properties are imparted thereto by a sheet of baryta paper 4 interposed between the said back and the image-layer 3, said sheet being preferably stuck to the back 6. The natural convexity of the image-layer ensures the close and complete application of the latter against the surface 4.

This curvature is not apparent in the figure, because it disappears when the mounting is terminated. It is moreover very slight, of the order of 1 mm. camber for an image of 30 x 40 cm., as mentioned above.

In another embodiment of the invention, the rigid back may belong to the bottom of a frame, as shown by the constructional modification of Figure 3, in which 6 again designates the reflecting and diffusing surface, incorporated in the bottom 6 of the frame. Said surface may be constituted for instance by a thin sheet metal plate, having a suitable coating, and secured to the bottom of the frame 6, made of wood or any other suitable material.

In order to act as reflector-diffuser, and as illustrated in Figure 4, the bottom 6 of the frame may be treated as above stated, that is to say, instead of carrying a reflector-diffuser 6, it may be provided, by suitably treating the inner surface thereof, with a coating or deposit having the required properties; in other words, according to this method of carrying out the invention, a compound frame bottom will be constituted, the inner part of which is adapted to form reflector-diffuser.

The "selectoplate" is placed in the groove 7 of the ornamental frame 10 illustrated by way of example in Figure 5, and the back 6—6, preferably slightly bulged and of sufficient rigidity, is, for instance, clamped against the latter by means of screwed strips 8.

The various methods of application of the invention, capable of being considered from a practical standpoint, are diagrammatically illustrated in Figures 6, 7, 8, and 9 of the drawings. Figure 6 shows the case in which, the convexity of the "selectoplate" S being considered sufficient, the back 9 is rigid and plane. Figure 7 illustrates a back 9 the convexity of which is turned towards the "selectoplate" assumed to be plane. In Figure 8, the "selectoplate" and the back both have a convexity facing each other. Finally Figure 9 shows the case in which the convexity of the "selectoplate" is greater than the concavity of the back 9, so as to provide for a tight application of the image layer against the back. The thickness and the radii of curvature have been greatly exaggerated in these four figures, for sake of clearness.

It is to be understood that numerous constructional modifications may be imagined without departing from the scope of the invention.

Having now particularly described and ascertained the nature of my said invention and in what manner the same is to be performed, I declare that what I claim is:

1. A relief photograph comprising a rigid transparent support, a lenticular screen carried by one side of the support, a transparent image carrying layer fast on the other side of said support, and an independent rigid member provided with a reflecting and diffusing surface adapted to protect the outer side of said image carrying layer and securing means tightly pressing said independent member against the image layer only by its edges, at least one of the cooperating surfaces of the layer and independent member being convex, and being held by said securing means creating a tension in said cooperating surfaces for improving the close contact between the whole area of said layer and of said member.

2. A relief photograph comprising a glass support, a lenticular screen carried by one side of the support, a transparent image carrying layer fast on the other side of said support and an independent rigid member provided with a reflecting and diffusing surface, adapted to protect the outer side of said image carrying layer, and tightly pressed against the image layer only by its edges, the surface of the independent member facing the image carrying layer being flat, and the ratio between the thicknesses of the lenticular screen and of the glass support being chosen so as to give the surface of the image carrying layer facing the independent member a convexity, with reference to the latter, capable of creating a tension in the adjacent surfaces of the image carrying layer and the independent member for improving the close contact between the whole area of said layer and of said independent member.

MAURICE BONNET

REFERENCES CITED

The following references are of record in the file of this patent:

UNITED STATES PATENTS

| Number | Name | Date |
| --- | --- | --- |
| 956,916 | Wiederseim | May 3, 1910 |
| 2,140,702 | Kanolt | Dec. 20, 1938 |
| 2,231,139 | Reininger | Feb. 11, 1941 |

FOREIGN PATENTS

| Number | Country | Date |
| --- | --- | --- |
| 312,961 | Great Britain | June 4, 1929 |
| 852,964 | France | Nov. 18, 1939 |